(12) United States Patent
Ferris

(10) Patent No.: US 9,413,811 B2
(45) Date of Patent: Aug. 9, 2016

(54) ESTABLISHING UPLOAD CHANNELS TO A CLOUD DATA DISTRIBUTION SERVICE

(75) Inventor: James Michael Ferris, Cary, NC (US)

(73) Assignee: Red Hat, Inc., Raleigh, NC (US)

( * ) Notice: Subject to any disclaimer, the term of this patent is extended or adjusted under 35 U.S.C. 154(b) by 807 days.

(21) Appl. No.: 13/037,230

(22) Filed: Feb. 28, 2011

(65) Prior Publication Data

US 2012/0221626 A1 Aug. 30, 2012

(51) Int. Cl.
```
G06F 15/16    (2006.01)
G06F 15/173   (2006.01)
H04L 29/08    (2006.01)
H04L 12/14    (2006.01)
H04L 12/24    (2006.01)
G06F 9/50     (2006.01)
```

(52) U.S. Cl.
CPC .............. *H04L 67/10* (2013.01); *G06F 9/5072* (2013.01); *H04L 12/1485* (2013.01); *H04L 41/5096* (2013.01); *H04L 67/325* (2013.01)

(58) Field of Classification Search
CPC ............................. H04L 67/10; H04L 67/325
USPC ......................................... 709/217, 231, 224
See application file for complete search history.

(56) References Cited

U.S. PATENT DOCUMENTS

| | | | |
|---|---|---|---|
| 6,374,112 B1 * | 4/2002 | Widegren et al. | 455/452.2 |
| 6,944,662 B2 * | 9/2005 | Devine et al. | 709/225 |
| 7,024,429 B2 * | 4/2006 | Ngo et al. | |
| 7,249,314 B2 * | 7/2007 | Walker et al. | 715/205 |
| 2004/0243772 A1 * | 12/2004 | Wissenbach | 711/152 |
| 2007/0045424 A1 * | 3/2007 | Wang | 235/462.46 |
| 2007/0217349 A1 * | 9/2007 | Fodor et al. | 370/310.2 |
| 2013/0238572 A1 * | 9/2013 | Prahlad et al. | 707/692 |

OTHER PUBLICATIONS

Jeffrey Darcy, "Systems and Methods for Cloud-Based Directory System Based on Hashed Values of Parent and Child Storage Locations," U.S. Appl. No. 12/893,612, filed Sep. 29, 2010.
Jeffrey Darcy, "Systems and Methods for Searching a Cloub-Based Distributed Storage Resources Using a Set of Expandable Probes", U.S. Appl. No. 12/893,737, filed Sep. 29, 2010.
Jeffrey Darcy, "Systems and Methods for Monitoring Files in Cloud-Based Networks", U.S. Appl. No. 12/893,388, filed Sep. 29, 2010.
Jeffrey Darcy, "Systems and Methods for Dynamically Replicating Data Objects Within a Storage Network", U.S. Appl. No. 12/872,022, filed Aug. 31, 2010.
James Michael Ferris, "Systems and Methods for Stage Data Migration Between Data Sources and Cloud-Based Storage Network", U.S. Appl. No. 13/037,183, filed Feb. 28, 2011.

(Continued)

*Primary Examiner* — Karen Tang
(74) *Attorney, Agent, or Firm* — Lowenstein & Sandler LLP

(57) ABSTRACT

Embodiments relate to systems and methods for establishing upload channels to a cloud data distribution (CDD) service. In particular, an administrator of a user network can desire to migrate data to a cloud-based network via the CDD service. The administrator can provide specifications for transferring the data to the CDD service via a connection between the CDD service and the user network. The CDD service can generate a set of options for transferring the data based on the specifications and a specification of the connection. The set of options can be provided to the administrator, the administrator can select one of the options, and the transfer of the data can be initiated according to the selected option.

16 Claims, 6 Drawing Sheets

(56) References Cited

OTHER PUBLICATIONS

James Michael Ferris, "Systems and Methods for De-Populating Cloud Data Storage", U.S. Appl. No. 13/036,977, filed Feb. 28, 2011.

James Michael Ferris, "Systems and Methods for Migrating Data Among Cloud-Based Storage Networks Via a Data Distribution Service", U.S. Appl. No. 13/037,215, filed Feb. 28, 2011.

James Michael Ferris, "Systems and Methods for Generating a Selection of Cloud Data Distribution Service from Alternative Providers for Staging Data to Host Clouds", U.S. Appl. No. 13/037,148, filed Feb. 28, 2011.

James Michael Ferris, "Methods and Systems to Automaticaliy Extract and Transport Data Associated with Workload Migrations to Cloud Networks", U.S. Appl. No. 13/116,599, filed May 26, 2011.

James Michael Ferris, "Systems and Methods for Cloud Data Deployment Based on Preferential and/or Existing Subscription Relationships", U.S. Appl. No. 13/117,331, filed May 27, 2011.

James Michael Ferris, "Methods and Systems for Data Compliance Management Associated with Cloud Migration Events", U.S. Appl. No. 13/118,123, filed May 27, 2011.

James Michael Ferris, "Systems and Methods for Determining Consistencies in Staged Replication Data to Improve Data Migration Efficiency in Cloud Based Networks", U.S. Appl. No. 13/117,235, filed May 27, 2011.

James Michael Ferris, "Systems and Methods for Generating Optimized Host Placement of Data Payload in Cloud-Based Storage Network", U.S. Appl. No. 13/118,075, filed May 27, 2011.

* cited by examiner

ESTABLISHING UPLOAD CHANNELS TO A CLOUD DATA DISTRIBUTION SERVICE

FIELD

The present teachings relate to systems and methods for establishing upload channels to a cloud data distribution service, and more particularly to platforms and techniques for analyzing and configuring data transport connections and schedules based on channel capacities, schedules of users, and other factors.

BACKGROUND OF RELATED ART

Cloud computing environments utilize shared resources, software, and information that can be provided for use by end users. For example, a service level agreement (SLA) can be entered into between a vendor, such as an independent software vendor (ISV), and a cloud network provider whereby the cloud network provider agrees to commit an amount of resources associated with virtual machines in the cloud network for use by end users during operation of software products and applications of the vendor. In return, the cloud network provider can charge the vendor a specified rate in proportion to the amount of committed resources. The cloud network provider provides or maintains an amount of resources in the cloud network, such as server uptime, persistent storage, software application instantiation, network performance, cloud storage, support response time, and other elements.

A potential user or customer of the cloud network may wish to migrate or transport local network data from on-premise data stores to the cloud network. Existing data transport channels can have latency and bandwidth issues that can deter potential customers from utilizing large-scale cloud storage or other cloud resources. For example, the potential customers may not be able to afford the time necessary to migrate the local network data to the cloud network. In the case of terabyte-scale data stores or larger, attempting to migrate the data using the packet-switched public Internet could require many hours or days of time, or more. Further, other existing data transport methods such as offloading disks to a data center can be burdensome and time consuming.

Therefore, it may be desirable to provide systems and methods for establishing upload channels to a cloud data distribution service, including an ability to identify, recommend, configure, and/or optimized data transport channels and schedules based on connection capacities and schedules of users in order to pre-stage large-scale data to a cloud data distribution service.

DESCRIPTION OF EMBODIMENTS

Figure 1:
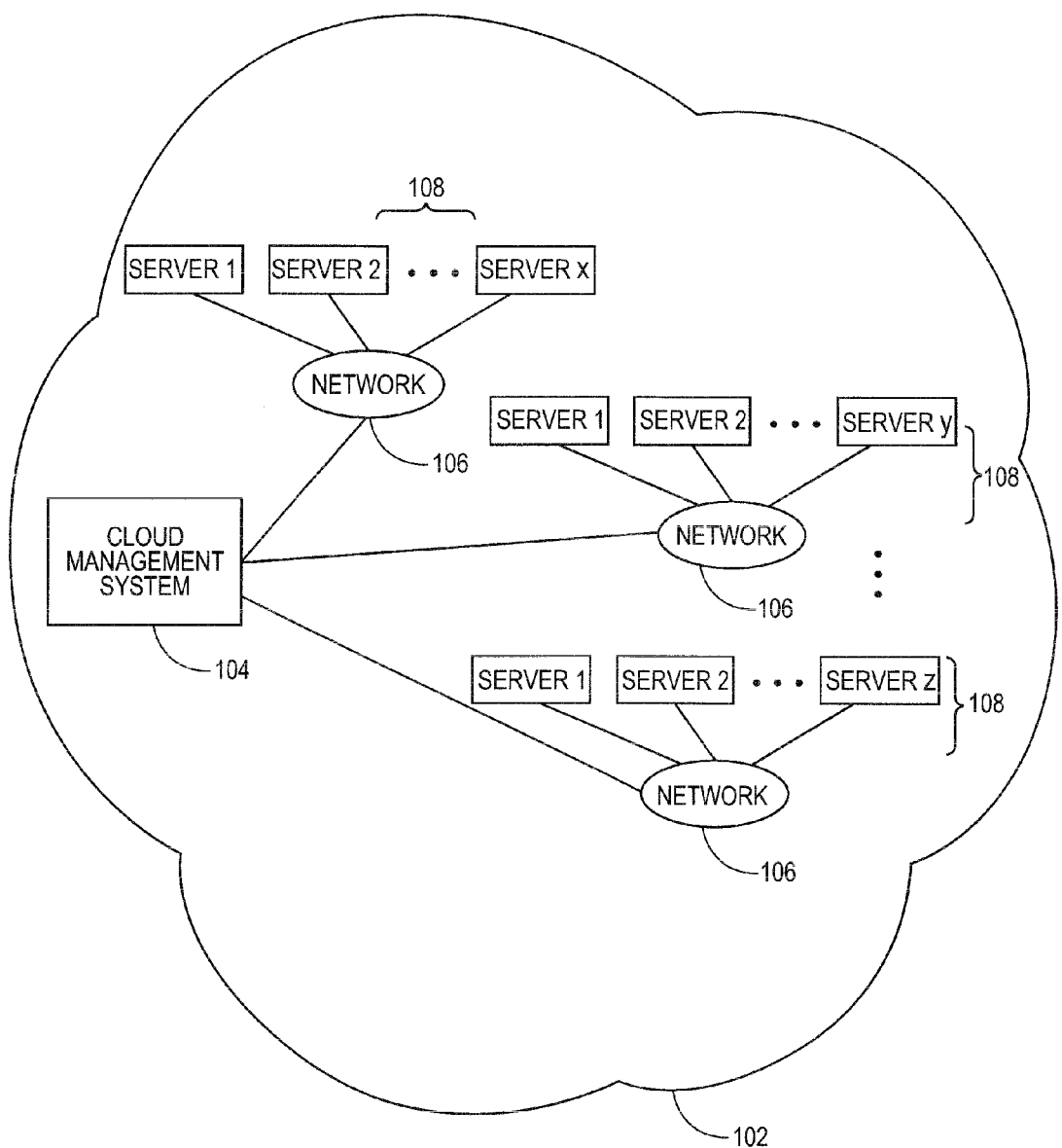
FIG. 1 illustrates an overall cloud system architecture in which various embodiments of the present teachings can be practiced.

Embodiments of the present teachings relate to systems and methods for establishing upload channels to a cloud data distribution (CDD) service. In aspects, embodiments relate to platforms and techniques for recommending data transport channels and schedules to a CDD service, based on connection capacities, schedules of users, and/or other factors. The CDD service can store data that is received from a user network or can transport the data received from an on-premise user network to a target cloud-based network. An administrator of the user network can desire to be presented with options or alternatives to transferring data of the user network to the CDD service. For example, the administrator can desire to transfer data in a short amount of time, within a specified time frame, under a specified cost, and other factors.

According to embodiments, the CDD service can own, operate, or otherwise manage a connection between the user network and the CDD service. An administrator or operator of the user network can generate a set of specifications associated with a transfer of data to the CDD service. The CDD service can receive the set of specifications from the administrator or other users and analyze the specifications in combination with specifications of the connection to generate one or more transfer options. The CDD service can present the one or more transfer options to the administrator for a selection. The data transfer or upload to the CDD service can commence according to the selected option. In embodiments, the data can be transferred in two directions. For example, the data can be transferred from the user network to the CDD service, and from the CDD service to the user network. In embodiments, the CDD service can be located in proximity to a target cloud-based network. In other embodiments, the CDD service can store data received from the user network or transfer data received from the user network to the target cloud-based network.

Embodiments as described herein can be implemented in or supported by a cloud network architecture, or other networks. As used herein, a "cloud" can refer to a cloud-based network comprising a collection of resources that can be invoked to instantiate a virtual machine, process, or other resource for a limited or defined duration. As used herein, a "user network" can refer to a plurality of components or resources comprising applications, appliances, instances, images, and other data to be transferred to the CDD service and/or the cloud. Further, as used herein, an "administrator" of a user network, a CDD service, or a cloud can refer to a person, user, owner, corporation, organization, or other entity having authoritative power to initialize, oversee, or otherwise manage the operation of the user network, CDD service, or cloud. Still further, as used herein, a "recommendation" can refer to an alternative, option, choice, selection, pick, and/or the like. Still further, as used herein, a "proximity" can refer to a general geographic proximity, range, radius, and/or otherwise distance between or among components.

As used herein, the "resources" of the user network, CDD service, or cloud can refer to software or hardware such as, for example, applications, programs, servers, device drivers, storage such as hard drives, virtual memory, databases, random access memory (RAM) and other memory, processors, multimedia cards, and the like, in the cloud. The resources can be accessed by users or by software or applications independent from or associated with resources of the user network, CDD service, or cloud. In embodiments, vendors such as ISVs can supply software resources for use with other resources in a cloud. Resources of the cloud can further refer to any communications resources, such as ports or channels provided to a virtual machine or other machine or process in the cloud. Resources can likewise include services, such as Web-based services deployed in the cloud, for example security or identity management services and/or other resources.

FIG. 1 illustrates an overall cloud system architecture in which various embodiments of the present teachings can be practiced. As shown for example in FIG.1, the collection of resources supporting a cloud 102 can comprise a set of resource servers 108 configured to deliver computing components needed to instantiate a virtual machine, process, or other resource. For example, one group of resource servers can host and serve an operating system or components thereof to deliver to and instantiate a virtual machine. Another group of resource servers can accept requests to host computing cycles or processor time, to supply a defined level of processing power for a virtual machine. A further group of resource servers can host and serve applications to load on an instantiation of a virtual machine, such as an email client, a browser application, a messaging application, or other applications or software. Other types of resource servers are possible.

In embodiments, the entire set of resource servers 108 or other hardware or software resources used to support the cloud 102 along with its instantiated virtual machines is managed by a cloud management system 104. The cloud management system 104 can comprise a dedicated or centralized server and/or other software, hardware, and network tools that communicate via network 106 such as the Internet or other public or private network with all sets of resource servers to manage the cloud 102 and its operation. To instantiate a new set of virtual machines, a user can transmit an instantiation request to the cloud management system 104 for the particular type of virtual machine that the user desires to invoke for its intended application. A user can for instance make a request to instantiate a set of virtual machines configured for email, messaging or other applications from the cloud 102. The request can be received and processed by the cloud management system 104, which identifies the type of virtual machine, process, or other resource being requested. The cloud management system 104 can then identify the collection of resources necessary to instantiate that machine or resource. In embodiments, the set of instantiated virtual machines or other resources can for example comprise virtual transaction servers used to support Web storefronts, or other transaction sites.

In embodiments, the user's instantiation request can specify a variety of parameters defining the operation of the set of virtual machines to be invoked. The instantiation request, for example, can specify a defined period of time for which the instantiated machine or process is needed. The period of time can be, for example, an hour, a day, or other increment of time. In embodiments, the user's instantiation request can specify the instantiation of a set of virtual machines or processes on a task basis, rather than for a predetermined amount of time. For instance, a user could request resources until a software update is completed. The user's instantiation request can specify other parameters that define the configuration and operation of the set of virtual machines or other instantiated resources. For example, the request can specify an amount of processing power or input/output (I/O) throughput the user desires to be available to each instance of the virtual machine or other resource. In embodiments, the requesting user can for instance specify a service level agreement (SLA) acceptable for their purposes. Other parameters and settings can be used. One skilled in the art will realize that the user's request can likewise include combinations of the foregoing exemplary parameters, and others.

When the request to instantiate a set of virtual machines or other resources has been received and the necessary resources to build that machine or resource have been identified, the cloud management system 104 can communicate with one or more of the set of resource servers 108 to locate resources to supply the required components. The cloud management system 104 can select providers from the diverse set of resource servers 108 to assemble the various components needed to build the requested set of virtual machines or other resources. It may be noted that in some embodiments, permanent storage such as hard disk arrays may not be included or located within the set of resource servers 108 available to the cloud management system 104, since the set of instantiated virtual machines or other resources may be intended to operate on a purely transient or temporary basis. In embodiments, other hardware, software or other resources not strictly located or hosted in the cloud can be leveraged as needed. For example, other software services that are provided outside of the cloud 102 and hosted by third parties can be invoked by in-cloud virtual machines. For further example, other non-cloud hardware and/or storage services can be utilized as an extension to the cloud 102, either on an on-demand or subscribed or decided basis.

With the resource requirements identified, the cloud management system 104 can extract and build the set of virtual machines or other resources on a dynamic or on-demand basis. For example, one set of resource servers 108 may respond to an instantiation request for a given quantity of processor cycles with an offer to deliver that computational power immediately and guaranteed for the next hour. A further set of resource servers 108 can offer to immediately supply communication bandwidth, for example on a guaranteed minimum or best-efforts basis. In other embodiments, the set of virtual machines or other resources can be built on a batch basis or at a particular future time. For example, a set of resource servers 108 may respond to a request for instantiation at a programmed time with an offer to deliver the specified quantity of processor cycles within a specific amount of time, such as the next 12 hours.

The cloud management system 104 can select groups of servers in the set of resource servers 108 that match or best match the instantiation request for each component needed to build the virtual machine or other resource. The cloud management system 104 can then coordinate the integration of the completed group of servers from the set of resource servers 108, to build and launch the requested set of virtual machines or other resources. The cloud management system 104 can track the combined group of servers selected from the set of resource servers 108, or other distributed resources that are dynamically or temporarily combined, to produce and manage the requested virtual machine population or other resources.

In embodiments, the cloud management system 104 can generate a resource aggregation table that identifies the various sets of resource servers that will be used to supply the components of the virtual machine or process. The sets of resource servers can be identified by unique identifiers such as, for instance, Internet protocol (IP) addresses or other addresses. The cloud management system 104 can register the finalized group of servers in the set of resource servers 108 contributing to an instantiated machine or process.

The cloud management system 104 can then set up and launch the initiation process for the virtual machines, processes, or other resources to be delivered from the cloud. The cloud management system 104 can for instance transmit an instantiation command or instruction to the registered group of servers in the set of resource servers 108. The cloud management system 104 can receive a confirmation message back from each participating server in the set of resource servers 108 indicating a status regarding the provisioning of their respective resources. Various sets of resource servers may confirm, for example, the availability of a dedicated amount of processor cycles, amounts of electronic memory, communications bandwidth, or applications or other software prepared to be served.

Figure 2:
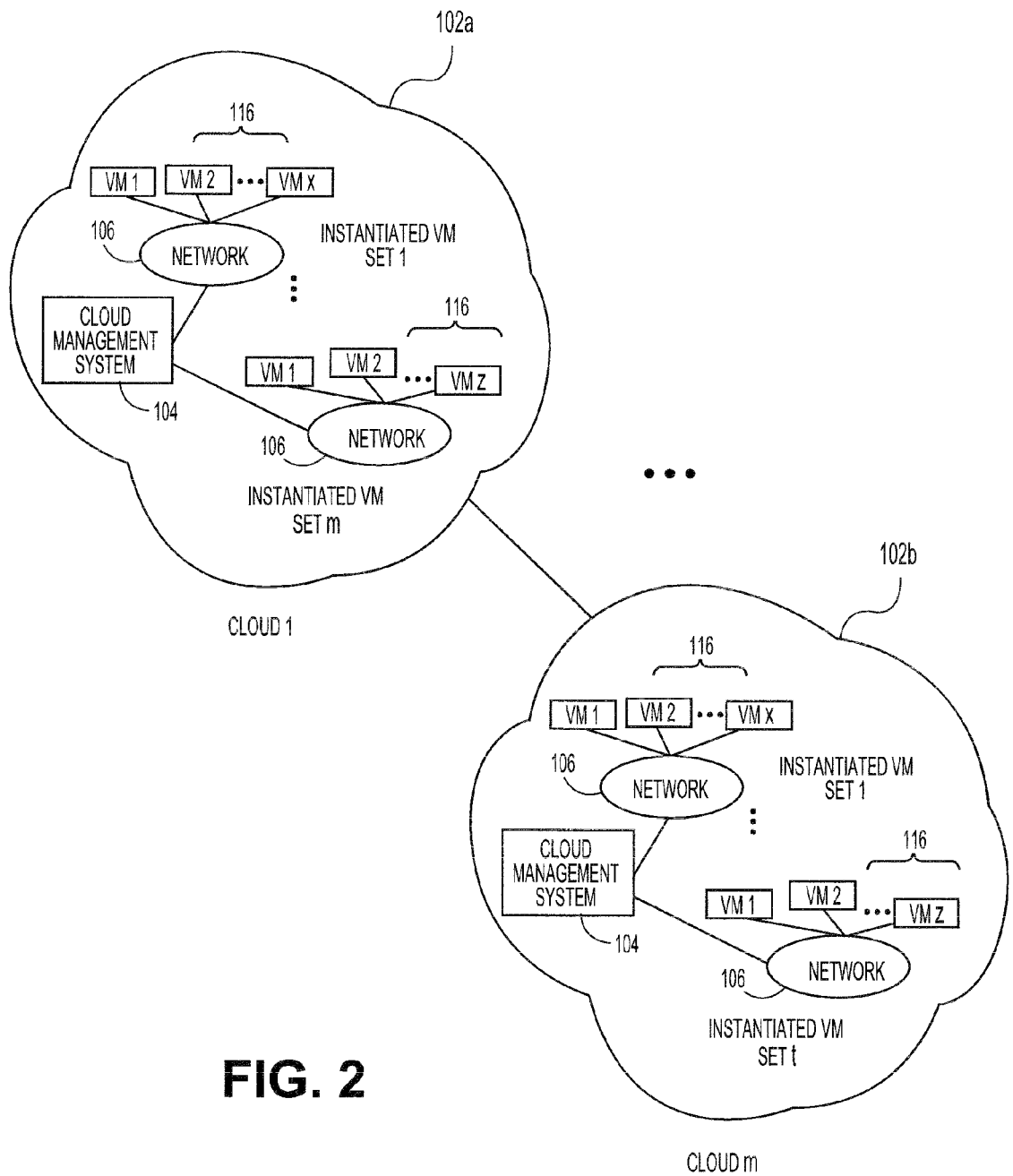
FIG. 2 illustrates an overall cloud system architecture including multiple cloud arrangements in which various embodiments of the present teachings can be practiced in another regard, according to various embodiments.

As shown for example in FIG. 2, the cloud management system 104 can then instantiate one or more than one set of virtual machines 116, or other processes based on the resources supplied by the registered set of resource servers 108 (shown in FIG. 1). In embodiments, the cloud management system 104 can instantiate a given number, for example, 10, 500, 1000, or other numbers of virtual machines to be made available to users on a network 106, such as the Internet or other public or private network. Each virtual machine can be assigned an instantiated machine ID that can be stored in the resource aggregation table, or other record or image of the instantiated population. Additionally, the cloud management system 104 can store the duration of each virtual machine and the collection of resources utilized by the complete set of instantiated virtual machines 116.

In embodiments, the cloud management system 104 can further store, track, and manage a user's identity and associated set of rights or entitlements to software, hardware, and other resources. Each user that populates a set of virtual machines in the cloud can have specific rights and resources assigned and made available to them. The cloud management system 104 can track and configure specific actions that a user can perform, such as provision a set of virtual machines with software applications or other resources, configure a set of virtual machines to desired specifications, submit jobs to the set of virtual machines or other host, manage other users of the set of instantiated virtual machines 116 or other resources, and other privileges or actions. The cloud management system 104 can further generate records of the usage of instantiated virtual machines to permit tracking, billing, and auditing of the services consumed by the user. In embodiments, the cloud management system 104 can for example meter the usage and/or duration of the set of instantiated virtual machines 116, to generate subscription billing records for a user that has launched those machines. Other billing or value arrangements are possible.

The cloud management system 104 can configure each virtual machine to be made available to users of the network 106 via a browser interface, or other interface or mechanism. Each instantiated virtual machine can communicate with the cloud management system 104 and the underlying registered set of resource servers 108 via a standard Web application programming interface (API), or via other calls or interfaces. The set of instantiated virtual machines 116 can likewise communicate with each other, as well as other sites, servers, locations, and resources available via the Internet or other public or private networks, whether within a given cloud 102a, 102b or between clouds.

It may be noted that while a browser interface or other front-end can be used to view and operate the set of instantiated virtual machines 116 from a client or terminal, the processing, memory, communications, storage, and other hardware as well as software resources required to be combined to build the virtual machines or other resources are all hosted remotely in the cloud 102a, 102b. In embodiments, the set of virtual machines 116 or other resources may not depend on or require the user's own on-premise hardware or other resources. In embodiments, a user can therefore request and instantiate a set of virtual machines or other resources on a purely off-premise basis, for instance to build and launch a virtual storefront or other application.

Because the cloud management system 104 in one regard specifies, builds, operates and manages the set of instantiated virtual machines 116 on a logical level, the user can request and receive different sets of virtual machines and other resources on a real-time or near real-time basis, without a need to specify or install any particular hardware. The user's set of instantiated machines 116, processes, or other resources can be scaled up or down immediately or within a short period of time on an on-demand basis, if desired. In embodiments, the various sets of resource servers that are accessed by the cloud management system 104 to support a set of instantiated virtual machines 116 or processes can change or be substituted, over time. The type and operating characteristics of the set of instantiated virtual machines 116 can nevertheless remain constant or almost constant, since instances are assembled from abstracted resources that can be selected and maintained from diverse sources based on uniform specifications.

In terms of network management of the set of virtual machines 116 that have been successfully configured and instantiated, the cloud management system 104 can perform various network management tasks including security, maintenance, and metering for billing or subscription purposes. The cloud management system 104 of a given cloud 102a, 102b can, for example, install or terminate applications or appliances on individual machines. The cloud management system 104 can monitor operating virtual machines to detect any virus or other rogue process on individual machines, and for instance terminate the infected application or virtual machine. The cloud management system 104 can likewise manage an entire set of instantiated virtual machines 116 or other resources on a collective basis, for instance, to push or deliver a software upgrade to all active virtual machines. Other management processes are possible.

In embodiments, more than one set of virtual machines can be instantiated in a given cloud at the same, overlapping, or successive times. The cloud management system 104 can, in such implementations, build, launch, and manage multiple sets of virtual machines based on the same or different underlying set of resource servers 108, with populations of different instantiated virtual machines 116 such as may be requested by different users. The cloud management system 104 can institute and enforce security protocols in a cloud 102a, 102b hosting multiple sets of virtual machines. Each of the individual sets of virtual machines can be hosted in a respective partition or sub-cloud of the resources of the main cloud 102a, 102b. The cloud management system 104 of a cloud can for example deploy services specific to isolated or defined sub-clouds, or isolate individual workloads/processes within the cloud to a specific sub-cloud. The subdivision of the cloud 102a, 102b into distinct transient sub-clouds or other sub-components which have assured security and isolation features can assist in establishing a multiple user or multi-tenant cloud arrangement. In a multiple user scenario, each of the multiple users can use the cloud platform as a common utility while retaining the assurance that their information is secure from other users of the overall cloud system. In further embodiments, sub-clouds can nevertheless be configured to share resources, if desired.

In embodiments, and as also shown in FIG. 2, the set of instantiated virtual machines 116 generated in a first cloud 102a can also interact with a set of instantiated virtual machines or processes generated in a second, third or further cloud 102b. Further, the cloud management system 104 of the first cloud 102a can interface with the cloud management system 104 of the second cloud 102b, to coordinate those domains and operate the clouds and/or virtual machines or processes on a combined basis. The cloud management system 104 of a given cloud 102a, 102b can track and manage individual virtual machines or other resources instantiated in that cloud, as well as the set of instantiated virtual machines or other resources in other clouds.

Figure 3:
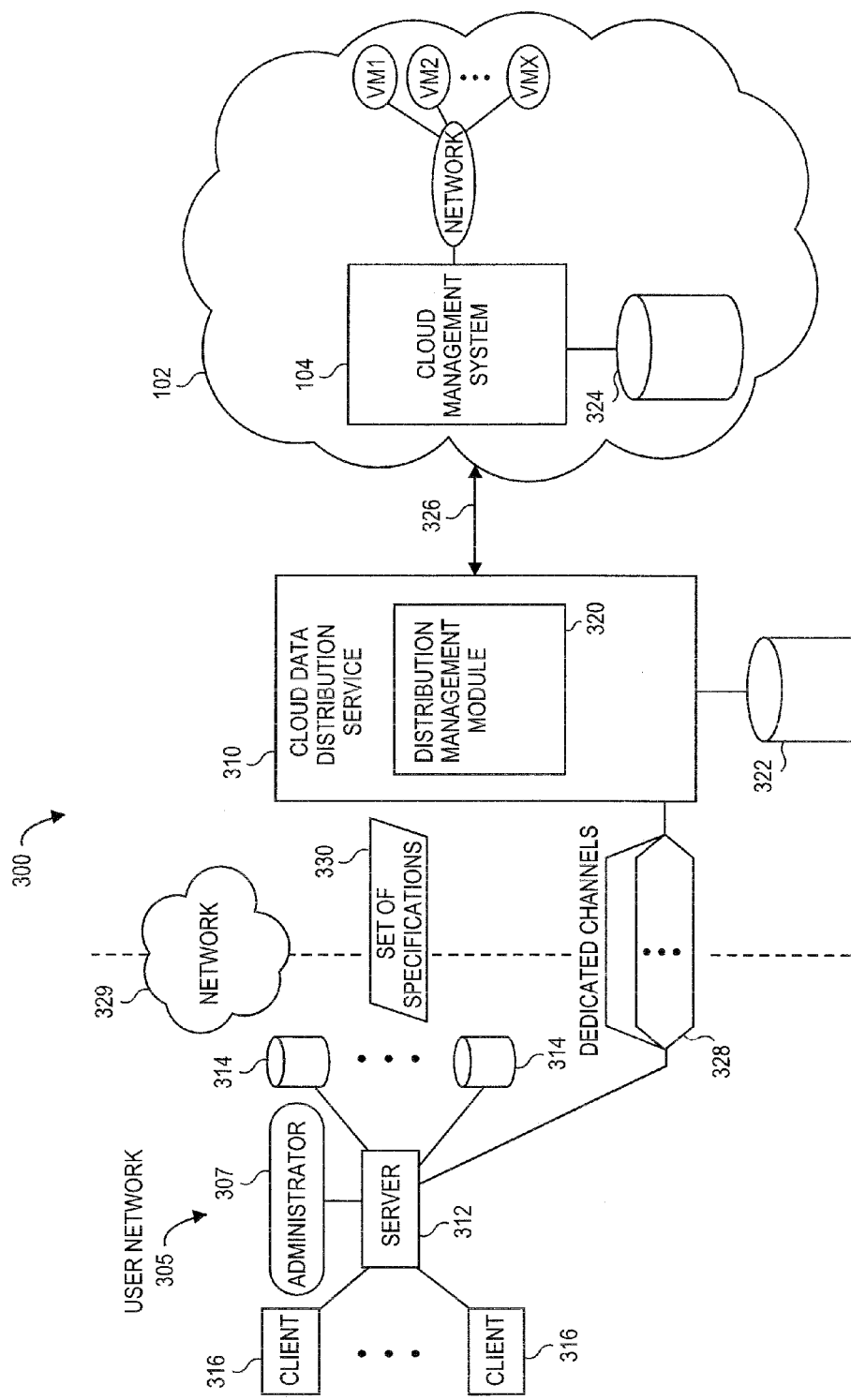
FIG. 3 illustrates an exemplary network configuration that can be used in systems and methods for establishing upload channels to a cloud data distribution service, according to various embodiments.

FIG. 3 illustrates an exemplary network configuration 300 that can be used in systems and methods for establishing upload channels to a cloud data distribution (CDD) service. In embodiments as shown, the network configuration 300 can comprise a user network 305 that can correspond to a network of a user, company, administrator, or any other entity. In embodiments, an administrator 307 can manage and oversee operations and resources of the user network 305. In embodiments, the user network 305 can be a local area network (LAN), personal area network (PAN), home area network (HAN), or any other type of network. The user network 305 can comprise one or more servers 312, one or more repositories 314, and one or more clients 316. In embodiments, the one or more servers 312 can operate and/or support services and resources of the user network 305, the one or more repositories 314 can store data associated with the user network 305, and the one or more clients 316 can be workstations or other devices allowing users to operate the services and resources of the user network 305. It should be appreciated that the user network 305 as depicted in FIG. 3 is merely exemplary and can comprise other configurations and resources.

As shown in FIG. 3, the network configuration 300 can comprise a cloud data distribution (CDD) service 310 configured to interface with the cloud 102. In embodiments, the CDD service 310 can be configured with a distribution management module 320 and storage 322. The CDD service 310 can stage and/or otherwise store data from the user network 305 intended to be delivered to the cloud 102. For example, the CDD service 310 can store data received from the user network 305 in the storage 322 to be delivered or provided to a repository 324 associated with the cloud 102. In some embodiments, the storage 322 can be a data center, set of servers, repositories, or any other type and combination of storage devices. In embodiments, resources of the CDD service 310 can be physically located within or in proximity to resources of the cloud 102. For example, the CDD service 310 can be connected or coupled to the cloud 102 via a connection 326 such as, for example, high speed and/or bandwidth cables, fiber optics, and/or other high bandwidth connections. In some embodiments, the resources of the CDD service 310 can be a part of the cloud management system 104. In further embodiments, the network configuration 300 can support multiple CDD services 310, multiple clouds 102, multiple resources thereof, and multiple combinations thereof.

According to embodiments, the administrator 307 of the user network 305 can desire to migrate data, applications, appliances, instances, images, and/or the like associated with the user network 305 to the cloud 102. For example, a bank can desire to migrate its customer and account data into cloud-based storage. In embodiments, the data of the user network 305 can be transferred to the CDD service 310 via a set of dedicated channels 328 such as, for example, a wide area network (WAN), a metropolitan area network (MAN), or other network connections. In embodiments, the set of dedicated channels 328 can be a public network connection such as, for example, the Internet.

In embodiments, the CDD service 310 can manage or operate components associated with the set of dedicated channels 328. For example, the CDD service can lease out connections, pipes, cables, and other like components to customers that desire to migrate data to the cloud 102 via the CDD service 310. In embodiments, the CDD service 310 can charge various rates for various components of the set of dedicated channels 328, at various times of the day or year, or on various days. For example, the rate for leasing out the set of dedicated channels 328 can be more during peak hours of the day (e.g. 8:00 AM to 5:00 PM) than off-peak hours (e.g. 5:00 PM to 8:00 AM). For further example, the rate for leasing out half of the components of the set of dedicated channels 328 can be less than leasing out all of the components of the set of dedicated channels 328. For further example, the rate can be dependent on a data rate (e.g. 1 gigabyte/minute) over the set of dedicated channels 328. It should be appreciated that multiple combinations of rates and prices are envisioned depending on times, amount and/or multiplicity of components, and/or other factors.

The administrator 307 or other entity associated with the user network 305 can desire to obtain various recommendations or options for migrating data to the cloud 102 via transmitting the data to the CDD service 310. In embodiments, the administrator 307 or other entity can compile a set of specifications 330 associated with transmitting the data. For example, the set of specifications 330 can indicate that it is preferential that the data be transmitted during off-peak hours. For further example, the set of specifications 330 can indicate that it is preferential that a specified amount of the data must be transmitted within a 2 hour time window. It should be appreciated that other combinations or specifications and multiples thereof are envisioned.

The administrator 307 or other entity can provide the set of specifications 330 to the CDD service 310. In embodiments, the set of specifications 330 can be provided in conjunction with a request for price options for transmitting the data of the user network 305 to the CDD service 310. In embodiments, the set of specifications 330 can be provided in any way, for example physically or over a network connection, such as a network 329. The distribution management module 320 can be configured to examine the set of specifications 330 and the components of the set of dedicated channels 328 to determine options, recommendations, and the like associated with transmitting the data of the user network 305 via the set of dedicated channels 328. In embodiments, the distribution management module 320 can run a simulation, projection, model, analysis, assessment, breakdown, evaluation, or the like based on any available data. In some embodiments, the distribution management module 320 can calculate the options based on parameters specified in the set of specifications 330 and the components of the set of dedicated channels 328. For example, the distribution management module 320 can determine that the data can be transmitted in two (2) hours using half of the components of the set of dedicated channels 328. For further example, the distribution management module 320 can determine that all of the requested data can be transmitted during off-peak hours for a reduced rate. It should be appreciated that other options are envisioned.

The distribution management module 310 can provide the options to the administrator 307 or any other entity associated with the user network 305. In embodiments, the administrator 307 can review the options and select one or more of the options based on time constraints, costs, or other factors.

Once the one or more options are selected, the distribution management module 320 and/or the administrator 307, or other entity, can initiate and manage the transmission of the data of the user network 305 to the CDD service 310 via the set of dedicated channels 328 and according to the selected one or more options. In embodiments, the data of the user network 305 can be stored in the storage 322, or can be transmitted to the cloud 102 via the connection 326, or a combination thereof. In other embodiments, the data at the CDD service 310 or in the storage 322 can be transferred back to any resources of the user network 305 in any way, and according to any set of specifications or requirements. In embodiments, the distribution management module 320 can provide, to the administrator 307 or other entity of the user network 305, a status report of the data transmission to the CDD service 310, the cloud 102, or a combination thereof, at various times during or after the transmission process.

Figure 4:
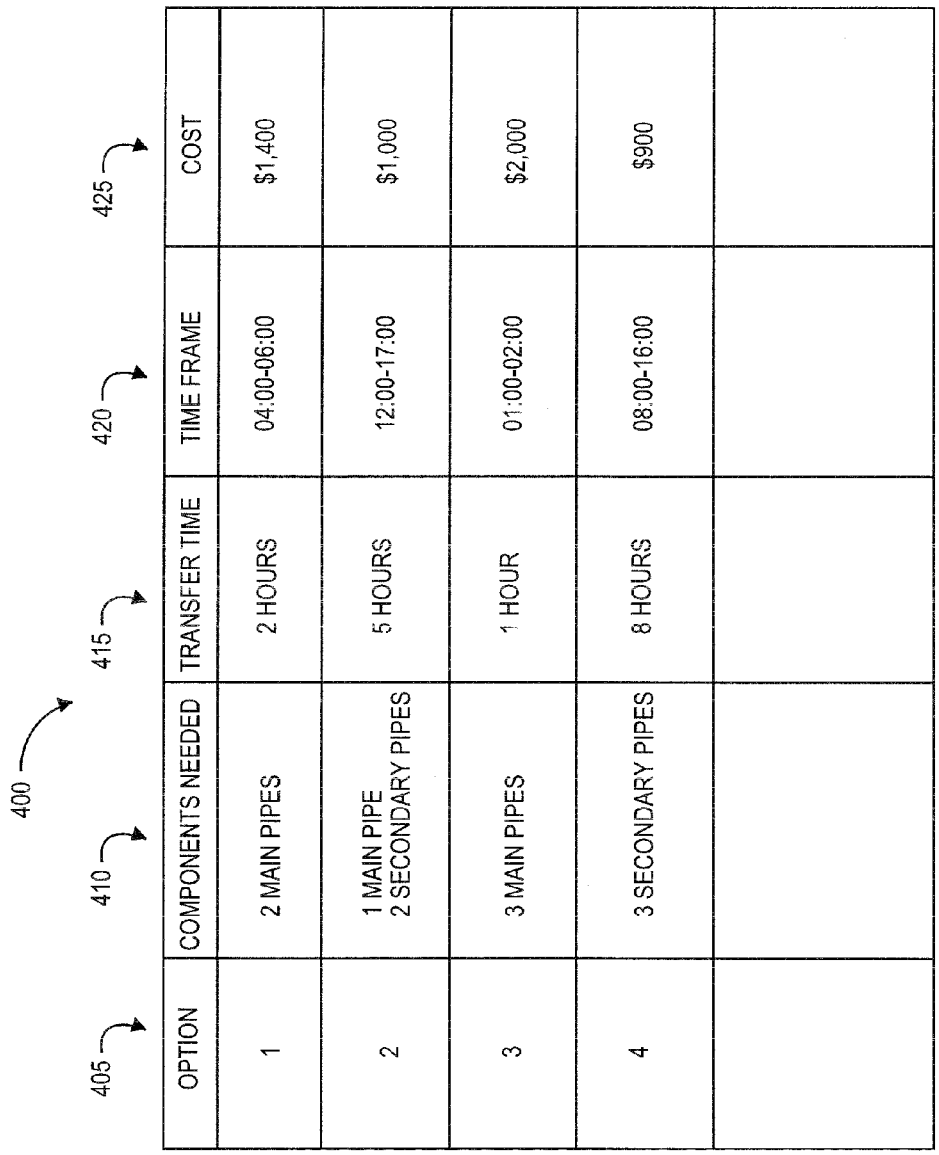
FIG. 4 illustrates an exemplary chart identifying upload channel options, according to various embodiments.

FIG. 4 is an exemplary chart 400 resulting from an exemplary analysis of an administrator's specifications and a connection to a CDD service. It should be appreciated that the values, variables, columns, and arrangements as shown in FIG. 4 are for illustration purposes and can be any value, variable, and arrangement. The chart 400 can represent an output of the exemplary analysis and can be provided to an administrator associated with a user network such as, for example, user network 305.

As shown in FIG. 4, the chart 400 can comprise an option number column 405, a components needed column 410, a transfer time column 415, a time frame column 420, and a cost column 425. In embodiments, the options as shown in the chart 400 and as specified in the option number column 405 can fulfill specifications of the administrator. In other embodiments, the options as specified in the option number column 405 can be close to fulfilling the specifications of the administrator. In embodiments, the components needed column 410 can indicate an amount, listing, or specification of the components of a connection (e.g. set of dedicated channels 328) that are needed to transfer data to the CDD service. For example, option #2 requires the use of 1 main pipe and 2 secondary pipes to transfer the data.

In embodiments, the transfer time column 415 can indicate the amount of time needed to transfer the amount of data specified in the specifications of the administrator. For example, if the administrator requires the transfer of 100 terabytes, the CDD service can calculate that the transfer will take, for example as indicated by option #3, one (1) hour. In embodiments, the time frame column 420 can indicate the time of day at which the transfer would take place. For example, as indicated by option #4, the transfer requested by the administrator would take place between the hours of 08:00 and 16:00. In some embodiments, the options can indicate which days of the week the transfer would take place, if the transfer would take place at different times on different days, and other arrangements.

In embodiments, the cost column 425 can indicate how much the CDD charges for the transfer. For example, option #1, if selected, would cost the administrator $1,400. In embodiments, the administrator or other entities associated with the user network can weigh the benefits and drawbacks of each of the options returned by the analysis. For example, if the administrator values transferring data in a short amount of time, at off-peak hours, and cost does not much matter, the administrator may select option #3. For further example, if cost is a significant factor to the administrator and the amount of time to transfer the data is not a big factor, the administrator may select option #4. In embodiments, the administrator can select one or more of the presented options, can request further options, can reject the options, and other responses.

Figure 5:
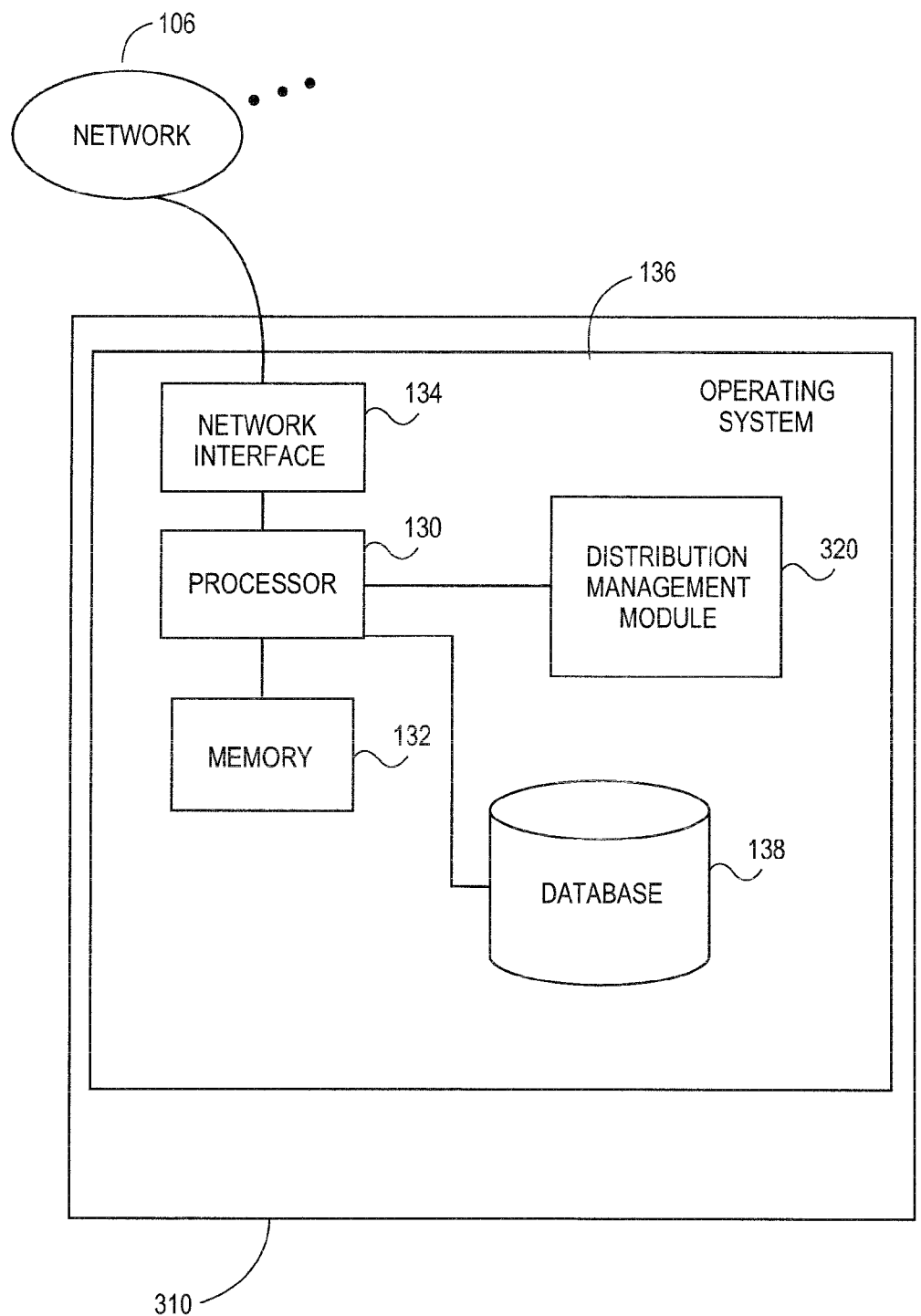
FIG. 5 illustrates an exemplary hardware configuration for a cloud data distribution service, according to various embodiments.

FIG. 5 illustrates an exemplary diagram of hardware and other resources that can be incorporated in the CDD service 310 configured to communicate with the cloud 102 and the user network 305 (as shown in FIG. 3), according to embodiments. In embodiments as shown, the CDD service 310 can comprise a processor 130 communicating with memory 132, such as electronic random access memory, operating under control of or in conjunction with operating system 136. Operating system 136 can be, for example, a distribution of the Linux™ operating system, the Unix™ operating system, or other open-source or proprietary operating system or platform. Processor 130 also communicates with one or more computer readable storage medium 138, such as hard drives, optical storage, databases, and the like. Processor 130 further communicates with network interface 134, such as an Ethernet or wireless data connection, which in turn communicates with one or more networks 106, such as the Internet or other public or private networks.

Processor 130 can also communicate with computer readable storage medium 138 and the distribution management module 320, to execute control logic, generate recommendations for data transfer as described herein, and execute a data transfer from the user network 305 to resources in cloud 102. Other configurations of the CDD service 310, associated network connections, and other hardware and software resources are possible.

Figure 6:
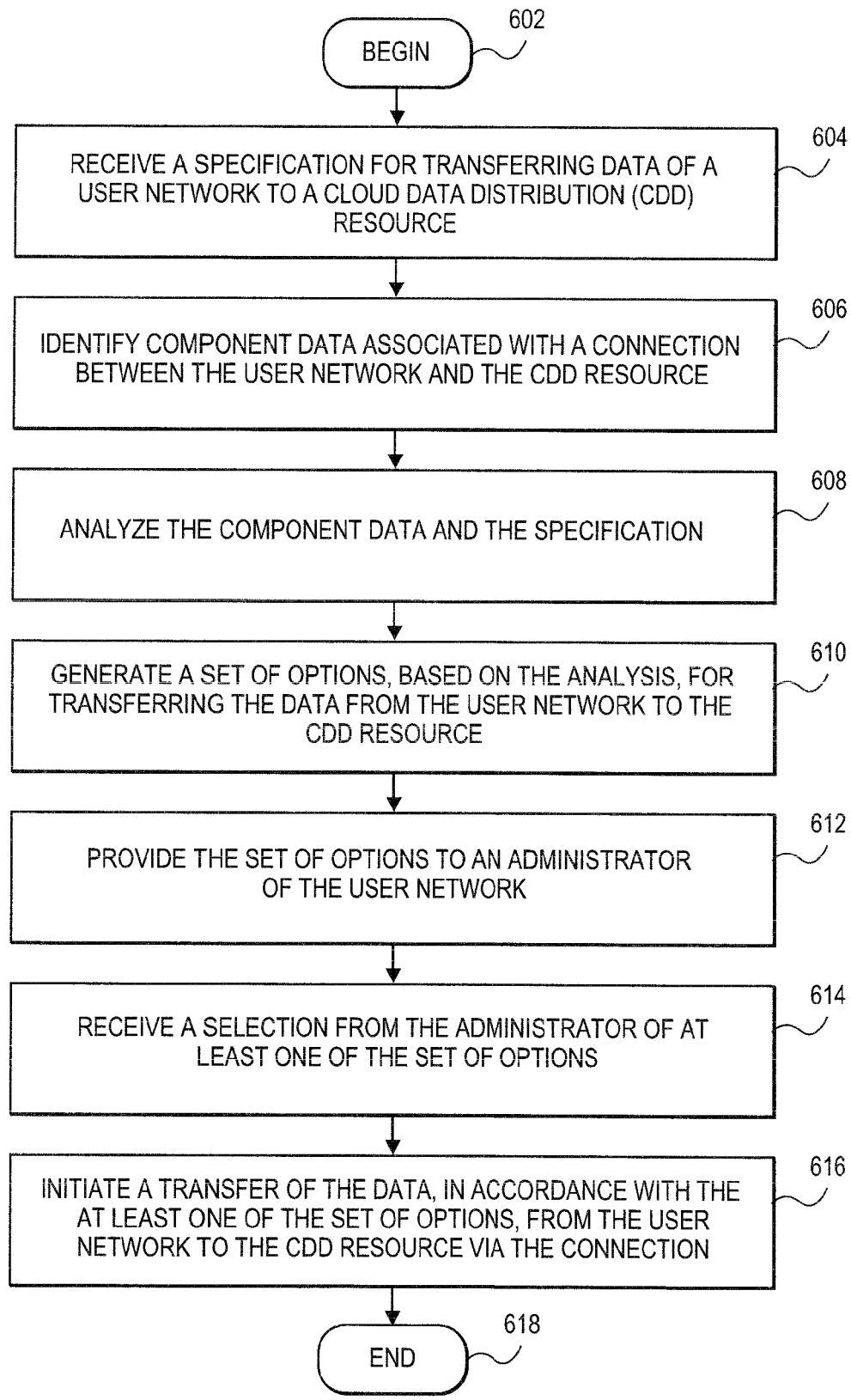
FIG. 6 illustrates a flowchart for establishing upload channels to a cloud data distribution service, according to various embodiments.

FIG. 6 illustrates a flowchart for establishing upload channels to a cloud data distribution service, according to various embodiments. In 602, processing can begin. In 604, a specification for transferring data of a user network to a CDD resource can be received. In embodiments, the specification can specify an amount of data to be transferred to the CDD resource, a time limit needed for the data transfer, a time frame in which to transfer the data, and other factors. In 606, component data associated with a connection between the user network and the CDD resource can be identified. In embodiments, the component data can detail specifications associated with the connection such as, for example, number of pipes, cables, and the like, transfer rates of the components, and other specifications. Further, the component data can specify pricing amounts associated with time frames and limits, amount of components needed, and other pricing factors.

In 608, the component data and the specification can be analyzed. In embodiments, the component data and the specification can be analyzed according to the connection specifications, the transfer rates requested and available, and any other metrics associated with the component data and the specification. In 610, a set of options for transferring the data from the user network to the CDD resource can be generated based on the analysis. In embodiments, the set of options can fulfill the specification or can detail options that are close to, or do not quite fulfill, the specification. In other embodiments, each of the set of options can detail the needed components of the connection, the necessary transfer time, the cost, and other elements.

In 612, the set of options can be provided to an administrator of the user network. In embodiments, the set of options can sent to the administrator or any other entity of the user network in any way and/or over any sort of network connection. In 614, a selection of at least one of the set of options can be received from the administrator. In embodiments, the administrator can select more than one of the set of options. Further, the administrator can specify when the data transfer is to initiate. In 616, the data can be transferred from the user network to the CDD resource via the connection and in accordance with the at least one of the set of options. In embodiments, an entity associated with the CDD can provide status reports to the administrator at any point before, during, or after the transfer of data. In further embodiments, the CDD resource can locally store the received data or transfer the received data to a cloud network. In 618, processing can end.

The foregoing description is illustrative, and variations in configuration and implementation may occur to persons skilled in the art. For example, while embodiments have been described which operate using one distribution management module 320 and associated CDD service 310, in embodiments, one or more of distribution management module 320 and associated CDD service 310, and/or other servers, data stores, and/or other logic or resources can be used. Other resources described as singular or integrated can in embodiments be plural or distributed, and resources described as multiple or distributed can in embodiments be combined. The scope of the present teachings is accordingly intended to be limited only by the following claims.

What is claimed is:

1. A method comprising:
    receiving, by a processing device, a specification comprising a plurality of transmission preferences to transfer data between a storage resource and a cloud data distribution (CDD) site, wherein the plurality of transmission preferences comprise a maximum amount of time to transfer the data between the storage resource and the CDD site;
    identifying, by the processing device in view of the specification and a plurality of additional configuration and operational parameters entered via a user interface, component data comprising a plurality of transmission resources to transfer the data between the storage resource and the CDD site;
    determining, by the processing device in view of the component data and the specification, a plurality of transmission options to transfer the data between the storage resource and the CDD site via a connection, wherein the plurality of transmission options comprise at least one transmission option that fulfills the specification and at least one transmission option that does not fulfill the specification;
    presenting, via the user interface, the plurality of transmission options;
    selecting a transmission option in view of at least one of a time constraint or a cost factor;
    in response to receiving the selected transmission option from the plurality of transmission options, initiating, in accordance with the selected transmission option, a transfer of the data between the storage resource and the CDD site; and
    providing, via the user interface, a status of the transfer of the data.

2. The method of claim 1, further comprising:
    providing the plurality of options on the user interface to a user.

3. The method of claim 1, further comprising:
    receiving the data at the CDD site from the storage resource; and
    transferring the data from the CDD site to a cloud-based network.

4. The method of claim 3, wherein the CDD site is in proximity to the cloud-based network.

5. The method of claim 1, further comprising:
    receiving the data at the CDD site from the storage resource; and
    storing the data at the CDD site.

6. The method of claim 1, wherein the specification further comprises at least one of an amount of data to be transferred, a time frame to transfer the data, or a price maximum.

7. The method of claim 1, wherein the plurality of transmission options comprises at least one of a needed component of the connection, a transfer time, a time frame, or a cost.

8. The method of claim 1, further comprising:
    determining, in view of the component data and the specification, a plurality of additional transmission options for transferring the data from the storage resource to the CDD site via the connection; and
    providing, via the user interface, the plurality of additional transmission options.

9. A system comprising:
    an interface to a cloud data distribution (CDD) site; and
    a processing device to communicate with the CDD site via the interface, the processing device to:
        receive a specification comprising a plurality of transmission preferences to transfer data between a storage resource and the CDD site, wherein the plurality of transmission preferences comprise a maximum amount of time to transfer the data between the storage resource and the CDD site;
        identify, in view of the specification and a plurality of additional configuration and operational parameters entered via a user interface, component data comprising a plurality of transmission resources to transfer the data between the storage resource and the CDD site;
        determine, in view of the component data and the specification, a plurality of transmission options to transfer the data between the storage resource and the CDD site via a connection, wherein the plurality of transmission options comprise at least one transmission option that fulfills the specification and at least one transmission option that does not fulfill the specification;
        present, via the user interface, the plurality of transmission options;
        select a transmission option in view of at least one of a time constraint or a cost factor;
        in response to receiving a selected transmission option from the plurality of transmission options initiate, in accordance with the selected transmission option, a transfer of the data between the storage resource and the CDD site; and
        provide, via the user interface, a status of the transfer of the data.

10. The system of claim 9, wherein the processing device is further to:
    provide the plurality of options on the user interface to a user.

11. The system of claim 9, wherein the processing device is further to:
    receive the data at the CDD site from the storage resource; and
    transfer the data from the CDD site to a cloud-based network.

12. The system of claim 11, wherein the CDD site is in proximity to the cloud-based network.

13. The system of claim 9, wherein the processing device is further to:
    receive the data at the CDD site from the storage resource; and
    store the data at the CDD site.

14. The system of claim 9, wherein the specification further comprises at least one of an amount of data to be transferred, a time frame to transfer the data, or a price maximum.

15. The system of claim 9, wherein the plurality of transmission options comprises at least one of a needed component of the connection, a transfer time, a time frame, or a cost.

16. The system of claim 9, wherein the processing device is further to:
- determine, in view of the component data and the specification, a plurality of additional transmission options to transfer the data from the storage resource to the CDD site via the connection; and
- provide, via the user interface, the plurality of additional transmission options.

* * * * *